(12) United States Patent
Morimoto

(10) Patent No.: US 7,720,770 B1
(45) Date of Patent: May 18, 2010

(54) SYSTEM AND METHOD FOR NEGOTIATING IMPROVED TERMS FOR PRODUCTS AND SERVICES BEING PURCHASED THROUGH THE INTERNET

(76) Inventor: Nobuyoshi Morimoto, 29-10-106, Sakuragaoka-cho, Shibuya-ku, Tokyo (JP)

( * ) Notice: Subject to any disclaimer, the term of this patent is extended or adjusted under 35 U.S.C. 154(b) by 2362 days.

(21) Appl. No.: 09/613,339

(22) Filed: Jul. 10, 2000

(51) Int. Cl.
 G06F 17/60 (2006.01)
(52) U.S. Cl. ..................................................... 705/80
(58) Field of Classification Search ............... 705/26, 705/27, 14, 80
See application file for complete search history.

(56) References Cited

U.S. PATENT DOCUMENTS

| | | | |
|---|---|---|---|
| 5,826,244 | A | 10/1998 | Huberman |
| 5,842,178 | A | 11/1998 | Giovannoli |
| 5,926,798 | A | 7/1999 | Carter |
| 5,970,475 | A | 10/1999 | Barnes et al. |
| 6,041,308 | A | 3/2000 | Walker et al. |
| 6,108,639 | A | 8/2000 | Walker et al. |
| 6,119,094 | A | 9/2000 | Lynch et al. |
| 6,119,101 | A | 9/2000 | Peckover |
| 6,125,352 | A | 9/2000 | Franklin et al. |
| 6,141,653 | A | 10/2000 | Conklin et al. |
| 6,285,986 | B1 * | 9/2001 | Andrews ............... 705/26 |
| 6,377,940 | B2 | 4/2002 | Tilfors et al. |
| 6,587,835 | B1 * | 7/2003 | Treyz et al. ............ 705/14 |
| 6,871,190 | B1 | 3/2005 | Seymour et al. |
| 6,871,191 | B1 * | 3/2005 | Kinney et al. ......... 705/37 |
| 2002/0002531 | A1 | 1/2002 | Lustig et al. |
| 2002/0029188 | A1 * | 3/2002 | Schmid ............... 705/38 |
| 2004/0059704 | A1 * | 3/2004 | Hellerstein et al. ..... 707/1 |

(Continued)

FOREIGN PATENT DOCUMENTS

JP 2009087310 A * 4/2009

OTHER PUBLICATIONS

Online Article: "Online Shopper; Reviving the Fine Art of Haggling, Online," *The New York Times*, Jan. 20, 2000.

(Continued)

*Primary Examiner*—Pierre E Elisca
(74) *Attorney, Agent, or Firm*—Robert C. Kowert; Meyertons, Hood, Kivlin, Kowert & Goetzel, P.C.

(57) ABSTRACT

A method and system for negotiating improved terms for a product being purchased over the Internet. Once a purchaser has made a decision to buy a specific product over the Internet, the purchaser may use the services of a personal negotiating broker-agent program to beat the best available purchase transaction within a specifiable time window. The personal broker-agent program may detect an issuance of a commitment to purchase over the Internet by a purchaser. The personal broker-agent program may then make an offer to the purchaser the option of waiting a predetermined amount of time while the broker agent searches for improved items. On acceptance of the option by the purchaser, the personal broker-agent program may conduct an auction and/or search the Internet for a better deal and may evaluate the auction and/or search responses to determine the best deal. The personal broker-agent program may then execute the best deal. If the purchaser elects not to accept the option from the personal broker-agent program, then the purchaser may execute the commitment to purchase transaction without delay.

44 Claims, 8 Drawing Sheets

U.S. PATENT DOCUMENTS

2006/0259418 A1* 11/2006 Feaver et al. .................. 705/37
2007/0208656 A1* 9/2007 Feaver et al. .................. 705/37

OTHER PUBLICATIONS

Online Article: "Let the Cyber Buyer Be in Control," *Businessweek Online, Information Technology*, Nov. 8, 1999.

Press Release, "Televideo Invests In Hot New Online Shopping Solution," mySimon.com, San Jose, CA, Sep. 22, 1998.

Press Release, "CNET, Inc. Completes Acquisition of mySimon, Inc.; San Francisco, CA Mar. 1, 2000" (www.CNET.com, Jun. 12, 2001).

"The Anatomy of a Large-Scale Hypertextual Web Search Engine," Sergey Brin and Lawrence Page, Seventh International World Wide Web Conference, Brisbane, Australia, Apr. 14-18, 1998.

Official Action from U.S. Appl. No. 09/895,457 (filed Jun. 29, 2001), mailed Jul. 17, 2006.

* cited by examiner

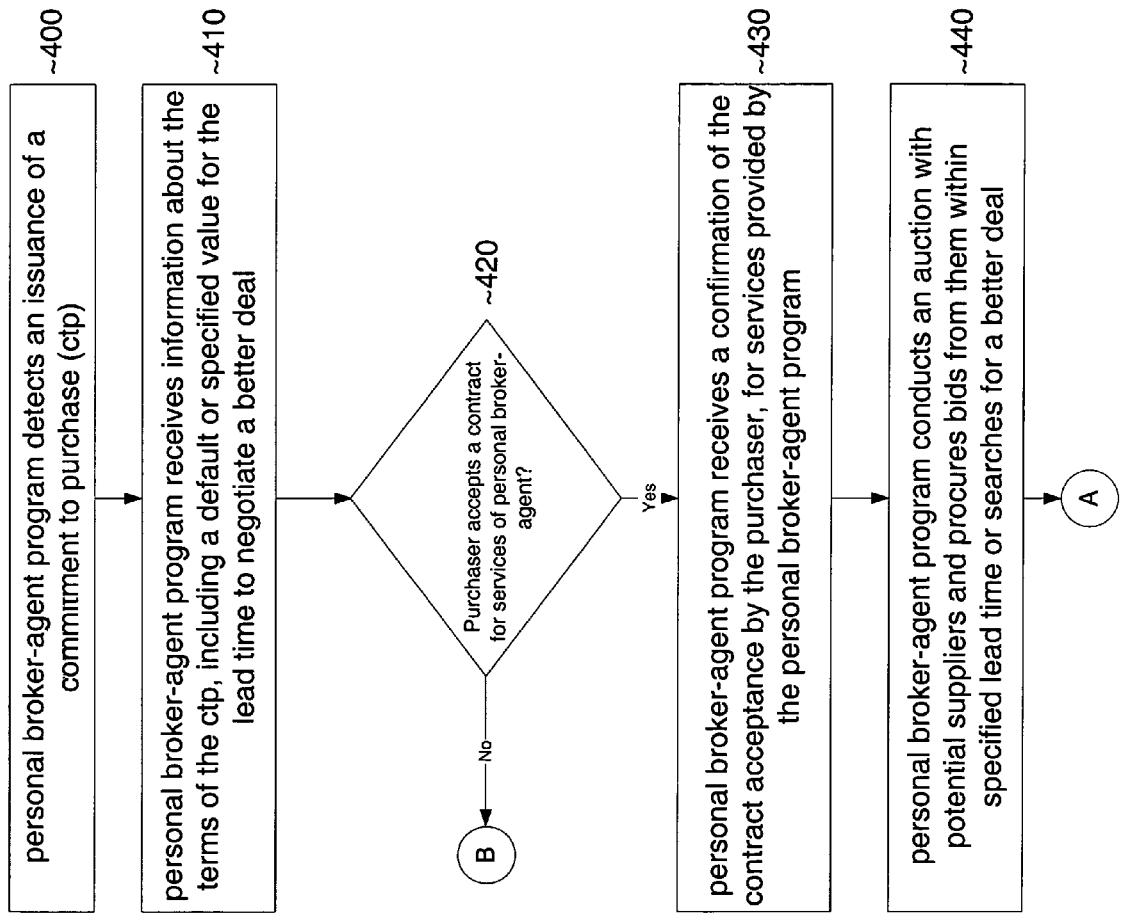

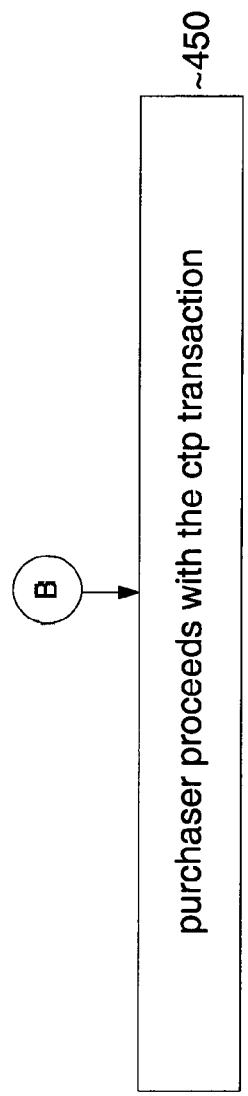
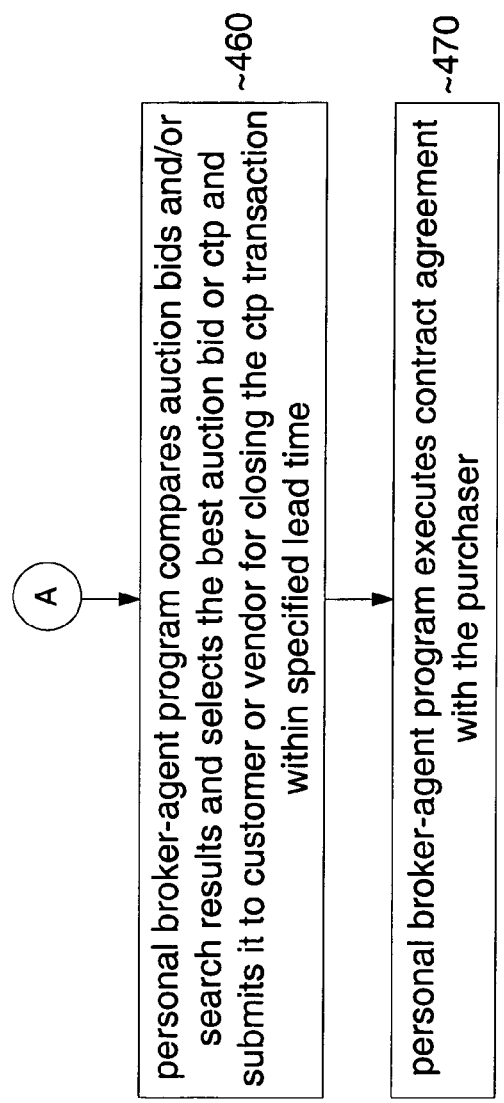
Figure 4b
Figure 4c

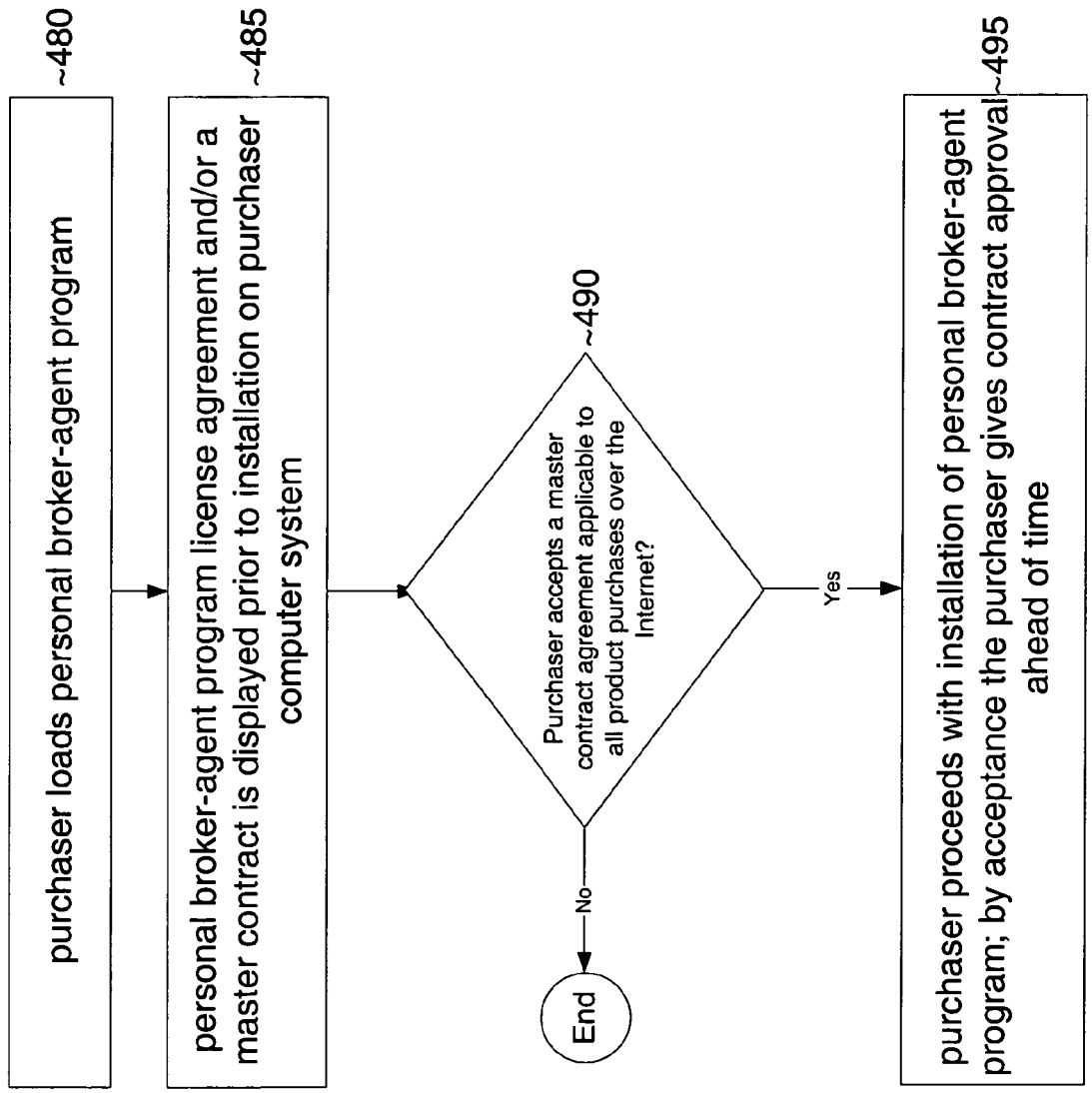

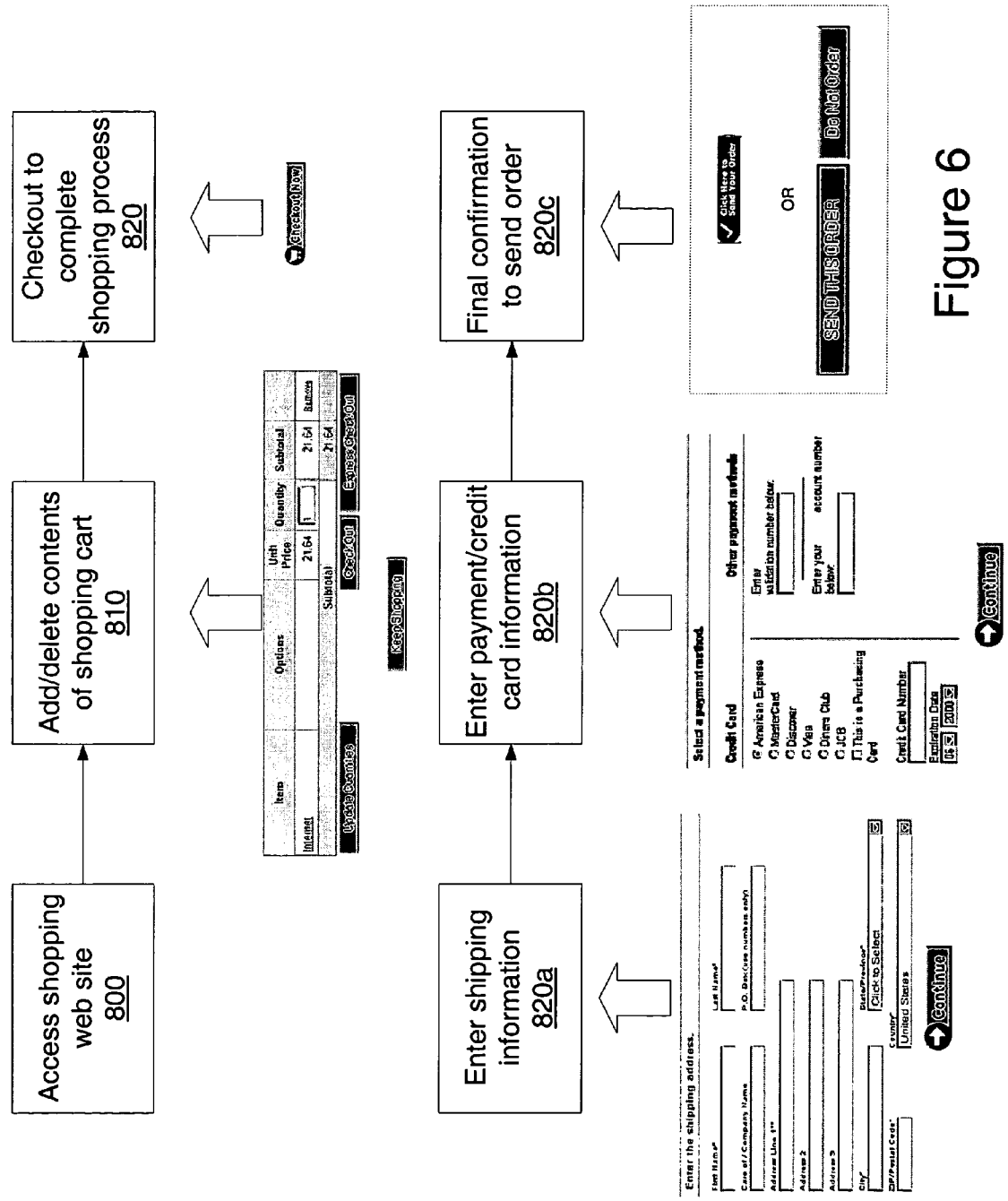

SYSTEM AND METHOD FOR NEGOTIATING IMPROVED TERMS FOR PRODUCTS AND SERVICES BEING PURCHASED THROUGH THE INTERNET

BACKGROUND OF THE INVENTION

1. Field of the Invention

The present invention generally relates to the Internet. More particularly, the present invention relates to a system and method for negotiating improved terms for products and services being purchased over the Internet.

2. Description of the Related Art

Internet commerce has become an increasingly popular form of commerce in the United States and throughout the world. In general, Internet-based commerce, often referred to as e-commerce, provides advantages to both suppliers and consumers. E-commerce provides vendors and service providers the ability to greatly increase their sales channel and distribution network with minimal cost. An Internet commerce site provides a convenient, effective and secure mechanism for potential buyers to browse, select and purchase goods or services in an easy and simple fashion.

The traditional purchasing process typically starts with the purchaser specifying the product specifications or requirements, including commercial terms such as price or delivery. The purchaser typically browses through a plurality of Internet commerce sites to locate the best deal, i.e., locating an Internet site, which matches the product specifications as specified by the purchaser, including the commercial terms. Very often the purchaser may not have the necessary skills to conduct an effective search for the best deal on the Internet. For example, the purchaser may only look at one or two popular Internet sites and ignore the rest.

A few Internet sites such as search engines may offer specialized shopping services. The search engine for shopping may allow the purchaser to set up a query or criteria for search. For example, a purchaser may specify a particular product brand name, model number, price, or delivery. The purchaser may specify a price not to exceed, or a price range or starting price. On specifying the criteria, the search engine may conduct a search for Internet sites matching the purchaser criteria.

Yet another method of purchasing products through the Internet, may utilize the purchasers participation in a group of purchasers to obtain volume discounts on price for a specific product.

A common dilemma faced by many purchasers is the uncertainty of knowing whether they have secured the best deal available. A question that is common to all purchasers who may have made a purchase through the Internet is 'Am I getting the best deal?' or 'Is there any other supplier who wants to give me a better deal?' For example, a purchaser may think they have been offered the lowest price for a DVD player at a popular shopping site only to later find out that a manufacturer's outlet store was offering an even lower price. Most consumers, however, do not have the time or patience to search hundreds of different stores and web sites to find the ultimate lowest price.

For these reasons, it would be desirable to provide a system and method for negotiating better terms for products and/or services purchased through the Internet. It would be desirable for the method and system to use a personal negotiating or broker-agent, which would secure the commitment of the purchaser to purchase a product, and yet at the same time be able to dynamically locate and/or negotiate a better deal on behalf of the purchaser. Advantageously, the method and system would in many instances deliver savings to the purchaser without additional effort on purchaser's part while also delivering profits to the personal negotiating agent service provider.

SUMMARY OF THE INVENTION

The present invention provides various embodiments of a system and method for locating and/or negotiating improved terms for products and/or services purchased over the Internet. Once a purchaser has made a decision to buy a specific product or service over the Internet, the purchaser may use the services of a broker-agent program to attempt to beat the specific price within a specifiable time window. Note, while a produce purchase shall be used in many of the example embodiments herein, it is understood that the system and method disclosed herein are just as applicable to the purchase of a services as they are to the purchase of a product.

In one embodiment, the personal broker-agent program may detect an issuance of a commitment to purchase by a purchaser over the Internet. Various methods, such as an entry of a credit card number or clicking of a "confirm order" button, may be, deployed to detect the issuance of the commitment to purchase. The personal broker-agent program may then get details of the commitment to purchase and determine if the purchase (e.g., based on the type of product service or the dollar amount of the purchase) is of business interest. If the purchase is of interest, then the personal broker-agent program may make an offer to the purchaser to accept or reject a contract to find the specified product with improved terms within a specified time window. The purchaser may accept or reject the contract, depending on the purchaser's ability to wait the time proposed by the personal broker-agent program.

If the purchaser accepts the contract, the personal broker-agent program may conduct an auction and/or search the Internet and other sources for a better deal. The provider of the personal broker-agent program may establish pre-negotiated agreements with preferred suppliers whereby the preferred supplier may guaranty a better price (e.g., by some fixed percentage) than the price included with the commitment to purchase. In one embodiment, the savings may be, in part, passed on to the purchaser and, in part, retained by the provider of personal broker-agent program as profit.

The personal broker-agent program may evaluate the auction responses and/or search results to determine the best deal. The contract between the purchaser and the personal broker-agent program may then be executed for the best deal. If the purchaser elects not to accept the contract offer from the personal broker-agent program, then the purchaser may execute the original transaction.

Advantageously, the embodiments described above may potentially deliver savings to the purchaser and at the same time deliver profits to the personal broker-agent program provider. Furthermore, suppliers of Internet products may experience higher sale volumes by dealing with the broker agent program provider.

BRIEF DESCRIPTION OF THE DRAWINGS

FIGS. 4a, 4b, 4c and 4d illustrates a flow chart for one embodiment of a method for negotiating improved terms for a product being purchased over the Internet;

FIG. 6 illustrates an exemplary block diagram of an Internet based purchasing process.

Figure 1:
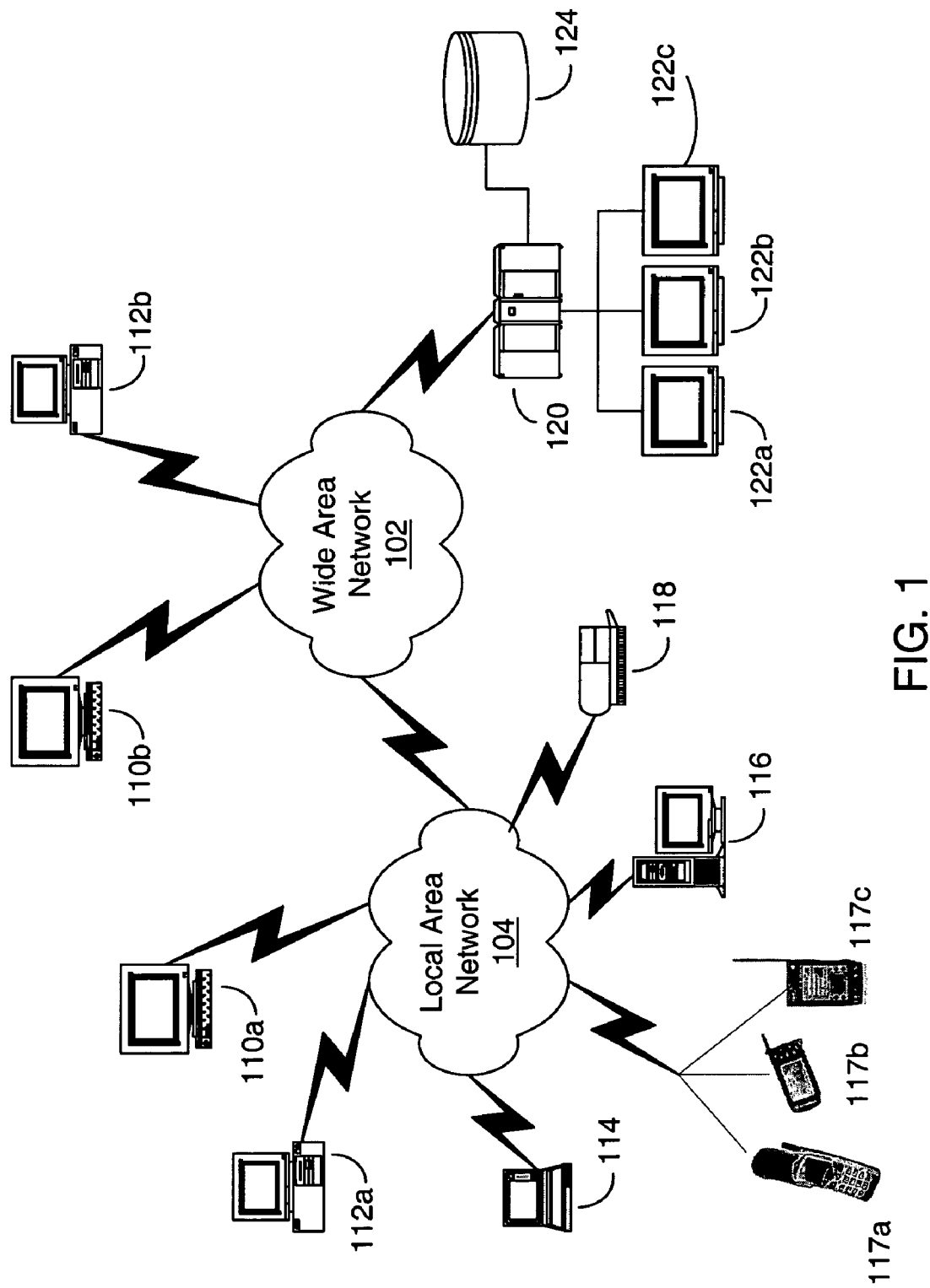
FIG. 1 is a network diagram of one embodiment of a wide area network, which is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF SEVERAL EMBODIMENTS

FIG. 1: Wide Area Network

FIG. 1 illustrates a wide area network (WAN) according to one embodiment. WAN 102 is a network that spans a relatively large geographical area. The Internet is an example of WAN 102. WAN 102 typically includes a plurality of computer systems which are interconnected through one or more networks. Although one particular configuration is shown in FIG. 1, WAN 102 may include a variety of heterogeneous computer systems and networks which are interconnected in a variety of ways and which run a variety of software applications.

One or more local area networks (LANs) 104 may be coupled to WAN 102. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 104 includes a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, an example LAN 104 may include one of each of computer systems 110a, 112a, 114, 116, and 117a/b/c and one printer 118. The LAN 104 may be coupled to other computer systems and/or other devices and/or other LANs 104 through WAN 102. Private communication networks, often referred to as an Intranet 304a, may comprise of one or more LAN's 104 and one or more WAN's 102.

One or more mainframe computer systems 120 may be coupled to WAN 102. As shown, the mainframe 120 may be coupled to a storage device or file server 124 and mainframe terminals 122a, 122b, and 122c. The mainframe terminals 122a, 122b, and 122c may access data stored in the storage device or file server 124 coupled to or included in the mainframe computer system 120.

WAN 102 may also include computer systems, which are connected to WAN 102 individually and not through a LAN 104: as illustrated, for purposes of example, a workstation 110b and a personal computer 112b. For example, WAN 102 may include computer systems, which are geographically remote and connected to each other through the Internet or the Intranet.

Figure 2:
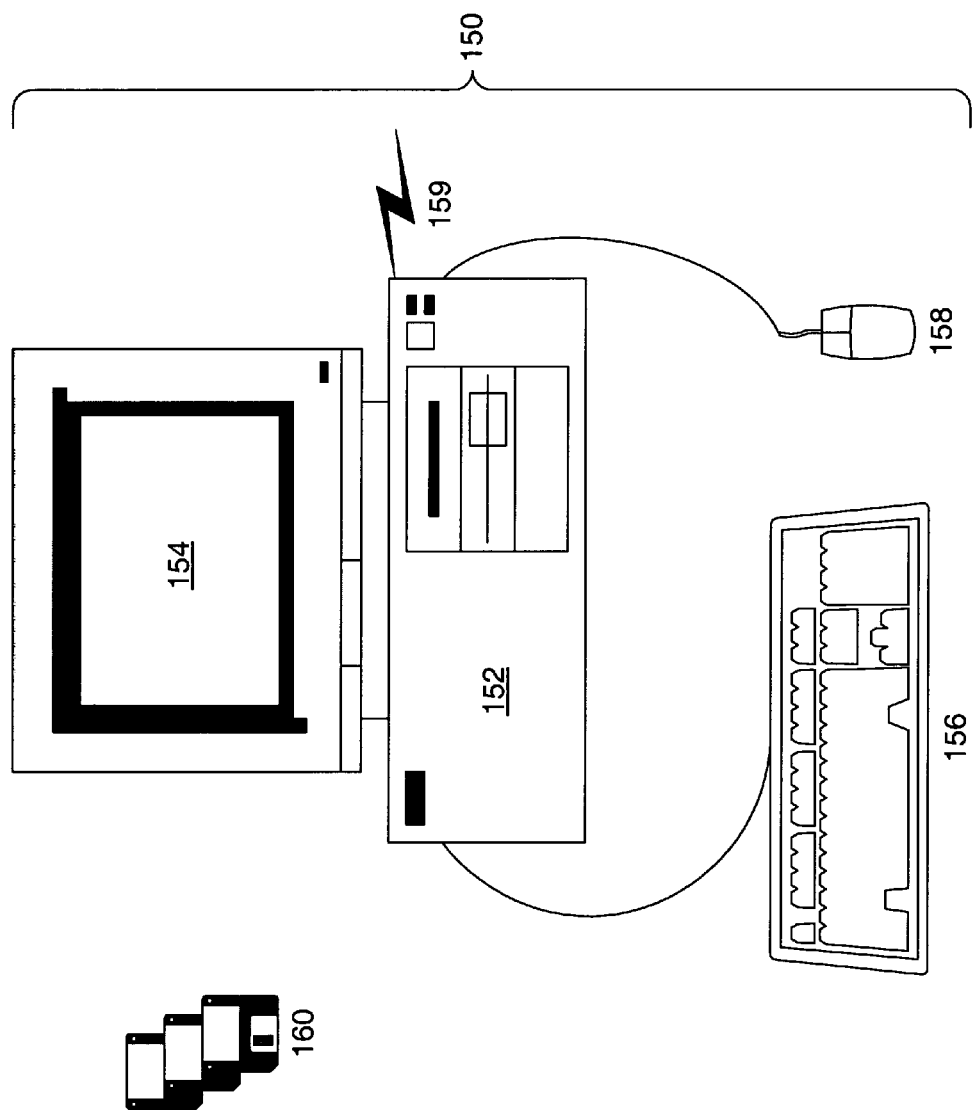
FIG. 2 is an illustration of one embodiment of a typical computer system, which is suitable for implementing various embodiments.

FIG. 2: Typical Computer System

FIG. 2 illustrates a typical computer system 150, which is suitable for implementing various embodiments of a system and method for negotiating improved terms for a product being purchased over the Internet. Each computer system 150 typically includes components such as a CPU 152 with an associated memory medium such as floppy disks 160, CD-ROMs, or DVDs (not shown). The memory medium may store program instructions for computer programs, wherein the program instructions are executable by the CPU 152. The computer system 150 may further include a display device such as a monitor 154, an alphanumeric input device such as a keyboard 156, communication device such as a modem 159 and a directional input device such as a mouse 158.

In one embodiment, the computer system 150 may be a client computer 306, operable by a computer user, to execute the computer programs to negotiate improved terms for a product being purchased over the Internet as described herein. In another embodiment, the computer system 150 may be an e-commerce server 302 operable to execute the computer programs to negotiate improved terms for a product being purchased as described herein. Other embodiments of the computer system 150 may include, but are not limited to, a proxy server 312, a local Internet server 322, a mainframe computer, a personal computer, and several others as described herein.

The computer system 150 preferably includes a memory medium on which computer programs according to various embodiments may be stored. The term "memory medium" is intended to include an installation medium, e.g., a CD-ROM, or floppy disks 160, a computer system memory such as DRAM, SRAM, EDO RAM, Rambus RAM, or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution. The computer system 150 may also include a time keeping device such as a real-time clock. The real-time clock of the computer system 150 may be, periodically or on demand, synchronized with a global standard time clock. Also, the computer system 150 may take various forms, including but not limited to a personal computer system, mainframe computer system, workstation, network appliance, Internet appliance, personal digital assistant (PDA), Internet enabled PDA 117b or 117c, web television system, Internet enabled cellular telephone 117a or any other similar device. In general, the term "computer system" can be broadly defined to encompass any device having a processor, which executes instructions from a memory medium.

The memory medium preferably stores a software program or programs for negotiating improved terms for a product being purchased over the Internet as described herein. The software program(s) may be implemented in any of various ways, including procedure-based techniques, component-based techniques, and/or object-oriented techniques, among others. For example, the software program may be implemented using ActiveX controls, programming languages such as C++, Java, Visual Basic, object oriented software based on COM/DCOM and/or CORBA objects, JavaBeans, Microsoft Foundation Classes (MFC), browser-based applications (e.g., Java applets), traditional programs, or other technologies or methodologies, as desired. A CPU, such as the host CPU 152, executing code and data from the memory medium includes a means for creating and executing the software program or programs according to the methods and/or block diagrams described below.

Figure 3:
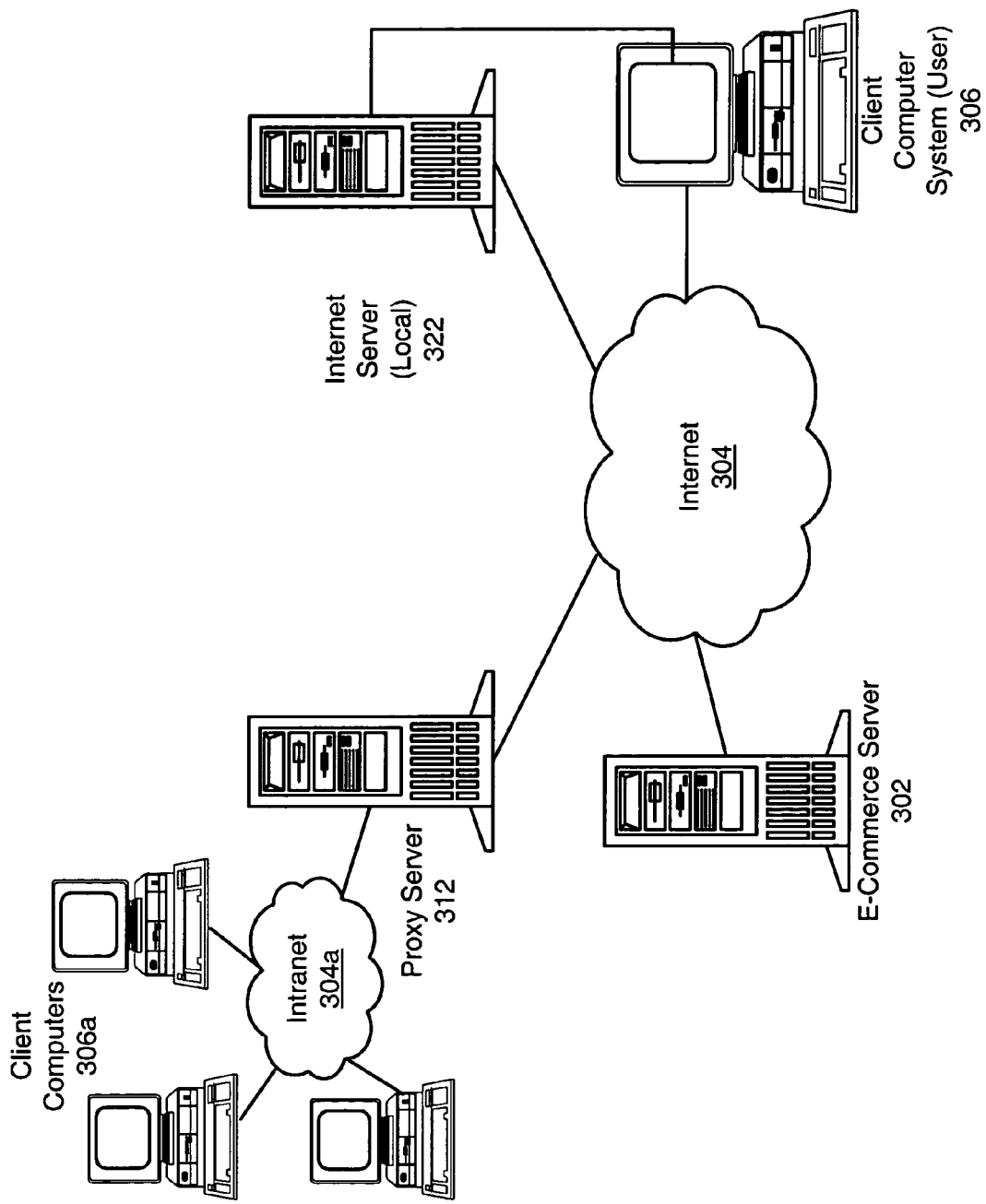
FIG. 3 illustrates an exemplary e-commerce network system for identifying distinctive computer users accessing a web site according to one embodiment.

FIG. 3: Network System to Negotiate Improved Terms for a Product Being Purchased FIG. 3 illustrates a simplified and exemplary Internet commerce or e-commerce network system to negotiate improved terms for a product being purchased according to one embodiment.

As used herein, the term "Computer User" is intended to include any person who can operate a computer 150 to gain access to an Internet web site hosted by server 302. In one embodiment, the access to an Internet web site may be provided by a proxy server 312. As used herein, the term "web site" is intended to include all Internet 304 as well as Intranet 304a sites, including e-commerce sites and groups of non-commercial Web pages, which can be accessed by a Uniform Resource Locator (URL).

As shown, the system may include an Internet server (local) 322, a proxy server 312 and an e-commerce server 302. All three servers shown are various embodiments of the computer system 150. The e-commerce server 302 is preferably maintained by a vendor who offers goods or services over the Internet. One example of an e-commerce vendor is Amazon.com, which sells books and other items over the Internet. In one embodiment, a web site may not directly offer goods and services for sale at the web site. For example, it may be a portal site to serve as a facilitator for buyers and sellers rather than offering goods and services directly for sale on its web site. The web site may only provide information to client computer users by providing URL links to buyers and sellers. A search engine web site, as another example, may only provide links to relevant web sites or its advertisers but may not sell goods or services at its own web site.

As shown, the e-commerce server 302 may be connected to a network 104, preferably the Internet 304. The Internet 304 is currently the primary mechanism for performing electronic commerce. However, the present invention may be used with any of various types of LAN's and/or WAN's, such as the Internet 304 and/or the Intranet 304a, which connects computers and networks of computers together, thereby providing the connectivity for enabling electronic commerce.

A client computer 306 may also be connected to the Internet 304 directly or via a local Internet server 322. One or more client computers 306a may be connected to the Internet 304 via a proxy server 312 and an Intranet 304a. The client computer system 306 may launch or execute Web browser software for allowing a user of the client computer 306 i.e., a client or a customer or a purchaser or a user, to browse and/or search the Internet 304 for products and services. The client computer system 306 also enables the purchaser to conduct e-commerce transactions over the Internet 304. For example, an e-commerce transaction may include a request for information, a purchase of a product, a payment, or a request to check order status. When the user of the client computer 306 desires to obtain information and/or purchase a good or service from a vendor over the Internet 304, the Web browser software preferably accesses the Web page of the respective e-commerce server, such as e-commerce server 302. The client may access the Web page of the e-commerce server 302 directly or may access the site through a proxy server 312 or some other third party like a search engine. When the client Web browser accesses the Web page of the e-commerce server 302, the e-commerce server 302 may recognize the computer user 306 as a potential purchaser.

The e-commerce server 302 may subsequently provide various data and information to the client browser on the client system 306, possibly including the products (goods and/or services) offered, descriptions and prices of these products, and other information that would typically be valuable to the purchaser of a product or a service. As used herein, the term "product" is intended to include various types of goods or services, such as books, CDs, content subscription services, furniture, online auction items, clothing, ISP service, consumer electronics, travel, software, medical supplies, computer systems, or various services such as loans (e.g., auto, mortgage, and home re-financing loans), securities (e.g., stocks, retirement accounts, bonds, and mutual funds), or insurance (e.g., life, health, auto, and home owner's insurance), among others.

The everyday shopping process may be applied in an e-commerce environment. The purchaser accessing an e-commerce server 302 may be analogous to a customer entering a store for shopping. The customer may initiate the electronic commerce shopping process by utilizing a virtual shopping cart, passing through various 'sections' or departments within the virtual store and adding one or more products to the virtual shopping cart. The customer may edit the contents of the shopping cart 810 by adding new items to the shopping cart, revising item quantities, or deleting items included in the shopping cart. The customer may confirm purchase by going through the check out process. The customer may end the shopping process by checking out 820, i.e., entering shipping information 820a, by making a payment for the contents of the shopping cart and accepting all the terms of the purchase 820b and clicking on a final confirmation button to send the order 820c. Clicking on a confirm order button on the screen may be described as placing a commitment to purchase (ctp) or making a purchase.

The e-commerce server 302 may be operated by an e-commerce vendor, or on behalf of the e-commerce vendor by a third party company, such as a web site hosting service provider or an application service provider.

FIG. 3 illustrates an exemplary embodiment including one e-commerce server 302, one client computer system 306, one proxy server 312 connected with one or more client computers 306a via Intranet 304a, and one Internet Server (Local) 322 which may be connected to the Internet 104. However, it is noted that the present invention may be utilized with respect to any number of e-commerce servers 302, proxy servers 312, and clients 306 or 306a.

This and various other embodiments may provide a number of benefits to suppliers, purchasers, as well as web site operators offering a method for negotiating improved terms. First, the purchaser may get a better deal in terms of price and/or delivery or warranty, for products or services purchased through the Internet. The supplier may get a firm order with a guaranteed payment. The supplier may also receive a higher volume due to a pre-negotiated arrangement with a personal broker-agent service provider. The personal broker-agent service provider may receive fees and/or commissions from the purchaser and/or the supplier > FIG. 4a: Flow Chart for Identifying a Method for Negotiating Improved Terms for a Product Being Purchased Over the Internet According to One Embodiment FIG. 4 illustrates a flow chart for identifying a method for negotiating improved terms for a product being purchased over the Internet according to one embodiment. In step 400, the personal broker-agent program, which may be executing as a background task in a computer system may detect the purchaser issuing a commitment to purchase (ctp). In one embodiment, the personal broker-agent program may be executed as a browser plug-in. In one embodiment, the purchaser may install a personal broker-agent program to assist the purchaser in finding a better deal within a predetermined or a specified time period. In one embodiment, the specified time period may be as short as a few minutes or as long as several days, depending on the flexibility of the purchaser. In one embodiment, the specified time may default to a fixed value of say 30 minutes.

In one embodiment, the personal broker-agent program may be automatically launched when the purchaser launches a web browser program on a computer system (e.g., as a browser plug-in). In another embodiment, the personal broker-agent program may be automatically launched when the purchaser initially powers on a computer system, being used to make a product purchase over the Internet. Once initiated, the personal broker-agent program may use various methods to detect the purchaser issuing, about to issue or has already issued a commitment to purchase (ctp). For example, in one embodiment, the personal broker-agent program may look for a specific URL address, which may include words such as 'confirm and order', 'checkout and shopping-cart', 'place and order'. In another embodiment, personal broker-agent program may search for a specific image file i.e. a gif for an icon or a button to check out the contents of a shopping cart. In another embodiment, the personal broker-agent program may look for a purchaser entering payment information 820, for example, a credit card number, a gift certificate number or a pre-paid account card number, using a secure protocol (e.g., https://) to make a payment for a product or service purchase. In another embodiment, the purchaser may manually notify the personal broker-agent program about issuing a commitment to purchase for a product purchase. Another embodiment may combine one or more of the methods listed above.

In step 410, the personal broker-agent program may receive information about the terms of sale for the purchased product. The specific terms may include, in one embodiment, a product price, a delivery schedule, a warranty and a return policy. In one embodiment, the personal broker-agent program may receive and hold, i.e. intercept the ctp message generated by the computer system of the purchaser before it is sent to the Internet web site server. In one embodiment, the personal broker-agent program may review the type of product being purchased over the Internet i.e., a DVD player, a book, a piece of furniture, or an insurance policy. The personal broker-agent program may elect to participate in some of the product areas, based on the business interests of the provider of the personal broker-agent program. If the product being purchased fits with the business interests, then the personal broker-agent program may make an offer to the purchaser to accept or reject a contract for negotiating a better deal i.e., searching for improved terms within the specified time. If the product being purchased does not fit with the business interests, then the personal broker-agent program may release the intercepted message and allow the purchaser to proceed with the commitment to purchase transaction. In one embodiment, the personal broker-agent program may elect to process all commitments to purchase placed by the supplier to protect customer loyalty.

In step 420, the purchaser is given an option to either accept or reject the contract presented by the personal broker-agent program to search for improved terms within the specified time. In one embodiment, the personal broker program may display a pop-up window on the purchaser's screen display. The display may have an icon such as an OK or Accept button. The purchaser may click on the OK or Accept button to indicate acceptance of the contract or click on No or Decline button to reject the contract. If the purchaser accepts the proposed contract then the program control passes on to step 430. In the event the purchaser rejects the proposed contract then the program control passes on to step 450. In step 450, the purchaser may proceed with completing the ctp transaction.

In one embodiment, steps 400, 410 and 420 may be combined wherein the purchaser initiates contact with the personal-broker agent program and makes a commitment to purchase a specified product. The purchaser may provide specific terms associated with the purchase of the product such as price, delivery, warranty, or other terms. The commitment to purchase may include a confirmed payment, and the purchaser may authorize the provider of the personal-broker agent program to make the specified purchase of the product within a pre-determined time interval.

In one embodiment, purchaser approval may be assumed or obtained ahead of time. The purchaser may load the personal broker-agent program in step 480 FIG. 4d. Prior to installing the personal broker-agent program, the personal broker-agent program service provider may require the purchaser to read and sign i.e., accept a license agreement and/or a master contract agreement for the use of that software in step 485. In step 490, the purchaser may elect to approve the master contract agreement or may elect to reject the agreement. If the purchaser rejects the master contract agreement then the personal broker-agent program is not installed on the purchaser's computer system. In step 495, the purchaser has accepted the terms of the master contract agreement and the personal broker-agent program is installed on the purchaser's computer system. Thus by executing steps 480, 485, 490 and 495 the purchaser may grant approval to contract ahead of time.

Steps 430, 440, 460 and 470 are executed in response to the purchaser accepting the contract for improved terms, presented by the personal broker-agent program, in one embodiment. In step 430, the personal broker-agent program receives a confirmation of acceptance of the contract for improved terms. In one embodiment, the purchaser may click on the OK or Accept button to indicate acceptance.

In step 440, the personal broker-agent program may conduct an auction to secure a better deal for the purchaser. In one embodiment, the auction may be conducted with a preferred set of suppliers for a specified product area. For example, one of the preferred suppliers may have established a pre-negotiated contract arrangement with the provider of the personal broker-agent program to beat any competitor's ctp price by at least two percent. The personal broker-agent program may receive responses to the auction request within the specified time. In another embodiment, the personal broker-agent program may conduct an Internet search for one or more suppliers who may be able to offer improved terms within the specified time. In another embodiment, the personal broker-agent program may conduct a search of a database, which may store the current prices, warranty terms and other terms of the most popular products purchased through the personal broker-agent program service provider. In response to the search, the personal broker-agent program may find one or more Internet sites offering improved terms.

Figure 5:
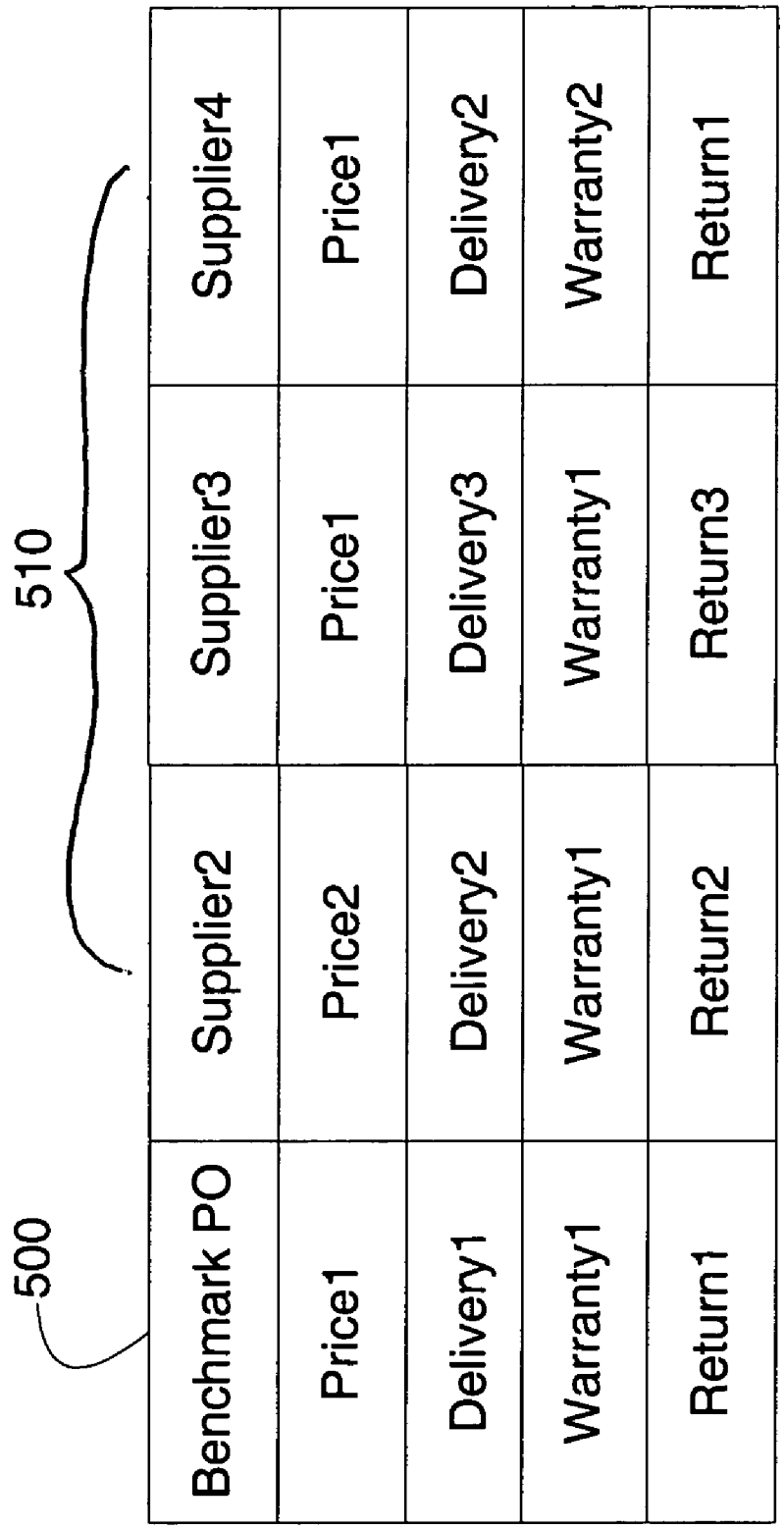
FIG. 5 illustrates one embodiment of a database record for comparing terms of purchase orders.

In step 460, the personal broker-agent program may compare the responses to the auction from the preferred suppliers and/or the Internet search and select the best deal, within the specified time. In one embodiment, the selection of the best deal may use selection criteria shown in FIG. 5 i.e., a comparison based on price, delivery, or other terms. The commitment to purchase may be considered as the benchmark purchased order 500 for comparison. Responses from preferred suppliers 510 may be compared against the benchmark. The personal broker-agent program may submit the best deal to the purchaser, within the specified time, for executing the contract. In one embodiment, if the auction and/or the search does not materialize in a better deal and if the ctp price has increased in the meantime, then the personal broker-agent program may still honor the ctp price to maintain purchaser goodwill and loyalty.

In step 470, the personal broker-agent program may execute the contract agreement with the purchaser. In one embodiment, executing the contract may include notifying or sending a confirmation to the purchaser via a variety of communication methods such as e-mail, phone, fax, or mail about the purchased product.

In another embodiment, the above method for negotiating improved terms for a product being purchased over the Internet may also be extended to products purchased from emerging computer system embodiments such as Internet appliances, cellular telephones with a browser 117a, web television or wireless PDA's with a browser 117b or 117c.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for negotiating improved terms for a product or service being purchased over the Internet, the method comprising:
    performing by a computer:
        detecting an issuance of a commitment to purchase with associated terms for said product or service being purchased by a purchaser using an Internet web site;
        in response to said detecting, making an offer to said purchaser to accept or reject a contract for negotiating said improved terms within a specified time;
        receiving an indication that said purchaser accepts said offer, and in response to said receiving:
            conducting a search for said improved terms within said specified time; and
            receiving said improved terms within said specified time; and
        initiating a purchase of said product or service on behalf of said purchaser according to said improved terms.

2. The method of claim 1, wherein said detecting comprises detecting said purchaser entering a credit card number or a pre-paid account number or a gift certificate number.

3. The method of claim 1, wherein said detecting comprises detecting said purchaser viewing a particular web page.

4. The method of claim 1, wherein said detecting comprises detecting said purchaser accessing a particular URL.

5. The method of claim 1, wherein said detecting comprises detecting said purchaser clicking an icon to confirm order.

6. The method of claim 1, wherein said making an offer to said purchaser comprises displaying said contract on a screen of a computer system used by said purchaser to purchase said product over the Internet.

7. The method of claim 1, further comprising:
    detecting an issuance of another commitment to purchase with associated terms for said product or service being purchased by another purchaser using an Internet web site;
    in response to said detecting the issuance of another commitment, making another offer to said other purchaser to accept or reject another contract for negotiating said improved terms within another specified time;
    receiving an indication that said other purchaser rejects said other offer;
    in response to said receiving an indication that said other purchaser rejects said other offer: executing said other commitment to purchase.

8. The method of claim 1, wherein said commitment to purchase comprises a purchase order for which payment has been guaranteed by said purchaser.

9. The method of claim 1, wherein said improved terms comprise a better price, or a better delivery, or a better warranty or a better return policy compared to the terms associated with said commitment to purchase.

10. The method of claim 1, wherein making an offer to said purchaser comprises:
    reading information associated with the commitment to purchase;
    determining whether the commitment to purchase represents an area of interest for an improved terms service provider;
    in response to determining that the commitment to purchase represents an area of interest for said improved terms service provider:
        making said offer to said purchaser.

11. The method of claim 1, wherein conducting said search for said improved terms comprises conducting an auction amongst a plurality of suppliers for said product.

12. The method of claim 1, further comprising, in response to receiving the indication that said purchaser accepts said offer, executing said contract, wherein executing said contract comprises entering a legal contract with said purchaser to supply said product under said improved terms.

13. The method of claim 1, wherein conducting said search for said improved terms comprises searching a database of preferred suppliers for said product.

14. A system for negotiating improved terms for a product or service being purchased over a computer network, the system comprising:
    a computer program;
    a web site server computer system;
    wherein said computer program is executable on a client computer system by a purchaser to connect with the web site server and detect an issuance of a commitment to purchase with associated terms for said product or service; and
    wherein the web site server is operable to:
        receive a notification about said issuance of said commitment to purchase;

in response to receiving said notification, make an offer to said purchaser to accept or reject a contract for negotiating improved terms within a specified time;

in response to said purchaser accepting said offer:
conduct a search for said improved terms within said specified time; and
receive said improved terms within said specified time; and initiate a purchase of said product or service on behalf of said purchaser according to said improved terms.

15. The system of claim 14, wherein said computer program is configured to detect the issuance of the commitment to purchase by detecting said purchaser entering a credit card number or a pre-paid account number or a gift certificate number.

16. The system of claim 14, wherein said computer program is configured to detect the issuance of the commitment to purchase by detecting said purchaser viewing a particular web page.

17. The system of claim 14, wherein said computer program is configured to detect the issuance of the commitment to purchase by detecting said purchaser accessing a particular URL.

18. The system of claim 14, wherein said computer program is configured to detect the issuance of the commitment to purchase by detecting said purchaser clicking an icon to confirm order.

19. The system of claim 14, wherein said web site server is configured to make the offer to said purchaser by displaying said contract on a screen of a computer system used by said purchaser to purchase said product over the Internet.

20. The system of claim 14, wherein the web site server is further operable to, in response to said purchaser rejecting said offer; execute said commitment to purchase.

21. The system of claim 14, wherein said commitment to purchase comprises a purchase order for which payment has been guaranteed by said purchaser.

22. The system of claim 14, wherein said improved terms comprise one or more of the following: a better price, a better delivery, a better warranty, or a better return policy, as compared to the terms associated with said commitment to purchase.

23. The system of claim 14, wherein said web server is configured to make the offer to said purchaser by:
reading information associated with the commitment to purchase;
determining whether the commitment to purchase represents an area of business interest for an improved terms service provider; and
in response to determining that the commitment to purchase represents an area of interest for said improved terms service provider, making said offer to said purchaser.

24. The system of claim 14, wherein conducting said search for said improved terms comprises conducting an auction amongst a plurality of suppliers for said product or service.

25. The system of claim 14, wherein the web site server is operable to, in response to said purchaser accepting said offer, execute said contract, wherein executing said contract comprises entering a legal contract with said purchaser to supply said product under said improved terms.

26. The system of claim 14, wherein conducting said search for said improved terms comprises searching a database of preferred suppliers for said product.

27. The system of claim 14, wherein said client computer system is one or more of the following: a personal computer, a laptop computer, a notebook computer, an Internet-enabled cellular phone, an Internet-enabled personal digital assistant, or an Internet-enabled television.

28. A storage medium storing program instructions that when executed by a computer cause the computer to implement the method of claim 1.

29. A method, comprising:
performing by a computer:
detecting an action by a purchaser that indicates that the purchaser is about to make an original purchase for a particular item or service over the Internet for a particular price;
in response to said detecting, offering the purchaser an opportunity to enter into an alternative contract in which the purchaser agrees to wait a predetermined amount of time in exchange for a possibility of securing a better price for said particular item or service;
searching for said better price for said particular item or service;
if said better price is found before said predetermined amount of time expires, purchasing the particular item or service for the purchaser at the better price and charging the purchaser a new price between said particular price and said better price; and
if said better price is not found before said predetermined amount of time expires, executing the original purchase for the particular item or service over the Internet for the particular price.

30. The method as recited in claim 29, further comprising: in response to determining that said original purchase is not available after said searching is complete, purchasing said particular item for said purchaser at another price and charging the purchaser said particular price.

31. The method of claim 29, wherein said detecting comprises detecting said purchaser entering a credit card number or a pre-paid account number or a gift certificate number.

32. The method of claim 29, wherein said detecting comprises detecting said purchaser viewing a particular web page.

33. The method of claim 29, wherein said detecting comprises detecting said purchaser accessing a particular URL.

34. The method of claim 29, wherein said detecting comprises detecting said purchaser clicking an icon to confirm order.

35. The method of claim 29, wherein said offering said purchaser said opportunity to enter into said alternative contract comprises displaying said alternative contract on a screen of a computer system used by said purchaser to make said original purchase over the Internet.

36. The method of claim 29, wherein said original purchase comprises a purchase order for which payment has been guaranteed by said purchaser.

37. The method of claim 29, wherein offering said purchaser said opportunity to enter into said alternative contract comprises:
reading information associated with said original purchase;
determining whether said original purchase represents an area of interest for an alternative contract provider;
in response to determining that said original purchase represents an area of interest for said alternative contract provider:
offering said alternative contract to said purchaser.

38. The method of claim 29, wherein searching for said better price comprises conducting an auction amongst a plurality of suppliers for said particular item.

39. The method of claim 29, wherein searching for said better price comprises searching a database of preferred suppliers for said particular item.

40. A storage medium storing computer program instructions that when executed by a computer cause the computer to implement the method of claim 29.

41. A method, comprising:

performing by a computer:

detecting an action by a purchaser that indicates that the purchaser is about to make an original purchase for a particular item or service over the Internet for a particular price;

in response to said detecting, automatically delaying said purchase for a predetermined amount of time;

searching for a better price for said particular item or service;

if said better price is found before said predetermined amount of time expires, purchasing the particular item or service for the purchaser at the better price and charging the purchaser a new price between said particular price and said better price; and if said better price is not found before said predetermined amount of time expires, executing the original purchase for the particular item or service over the Internet for the particular price.

42. A storage medium storing computer program instructions that when executed by a computer cause the computer to implement the method of claim 41.

43. The method of claim 41, wherein executing said contract comprises contacting said purchaser with a confirmation of said product purchase.

44. A method, comprising:

performing by a computer:

detecting an action by a purchaser that indicates that the purchaser is making an original purchase for a particular item or service over the Internet for a particular price;

in response to said detecting, accessing a broker-agent web site for seeking a better price for said particular item or service within a predetermined amount of time;

if said better price is found before said predetermined amount of time expires, purchasing the particular item or service for the purchaser at the better price and charging the purchaser a new price between said particular price and said better price; and if said better price is not found before said predetermined amount of time expires, executing the original purchase for the particular item over the Internet for the particular price.

\* \* \* \* \*